US 11,563,811 B2

(12) United States Patent
Chen

(10) Patent No.: US 11,563,811 B2
(45) Date of Patent: Jan. 24, 2023

(54) SCENARIO ORIENTED INFORMATION BROADCASTING SYSTEM BASED ON INTERNET OF THINGS

(71) Applicant: Asia Eastern University of Science and Technology, New Taipei (TW)

(72) Inventor: Peng-Wen Chen, New Taipei (TW)

(73) Assignee: Asia Eastern University of Science and Technology, New Taipei (TW)

( * ) Notice: Subject to any disclaimer, the term of this patent is extended or adjusted under 35 U.S.C. 154(b) by 0 days.

(21) Appl. No.: 17/329,106

(22) Filed: May 24, 2021

(65) Prior Publication Data

US 2021/0377344 A1    Dec. 2, 2021

(30) Foreign Application Priority Data

May 29, 2020   (TW) ................. 109118062

(51) Int. Cl.
| | |
|---|---|
| *H04L 29/08* | (2006.01) |
| *G09B 5/08* | (2006.01) |
| *G09B 5/10* | (2006.01) |
| *H04L 67/12* | (2022.01) |
| *H04L 67/30* | (2022.01) |

(52) U.S. Cl.
CPC ............. *H04L 67/12* (2013.01); *H04L 67/30* (2013.01)

(58) Field of Classification Search
CPC ................................ H04L 67/12; H04L 67/30
See application file for complete search history.

(56) References Cited

U.S. PATENT DOCUMENTS

| | | | | |
|---|---|---|---|---|
| 2004/0002049 | A1* | 1/2004 | Beavers | H04L 12/1813 434/350 |
| 2015/0229703 | A1* | 8/2015 | Merkel | H04L 67/10 709/203 |
| 2019/0312919 | A1* | 10/2019 | Kuchoor | H04L 67/141 |

FOREIGN PATENT DOCUMENTS

WO    WO-2018182055 A1 * 10/2018    ............. G06Q 50/00

\* cited by examiner

*Primary Examiner* — Christopher B Robinson
(74) *Attorney, Agent, or Firm* — Li & Cai Intellectual Property Office

(57) ABSTRACT

A scenario oriented information broadcasting system based on an Internet of Things is provided. A first electronic device provides first broadcast channels on an application and provides different first broadcast information respectively in the first broadcast channels via the Internet of Things. All or parts of contents of the first broadcast information are selected on the first electronic device based on a teaching scenario. The first electronic device identifies the second electronic device on which a user is logged into the application. After the second electronic device is successfully identified, the second electronic device can subscribe the first broadcast channel on the application, and then obtain and broadcast the first broadcast information via the Internet of Things. The first electronic device issues a subscription instruction to subscribe each of the second electronic devices, and receives a learning command from each of the second electronic devices.

9 Claims, 11 Drawing Sheets

SCENARIO ORIENTED INFORMATION BROADCASTING SYSTEM BASED ON INTERNET OF THINGS

CROSS-REFERENCE TO RELATED PATENT APPLICATION

This application claims the benefit of priority to Taiwan Patent Application No. 109118062, filed on May 29, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an information broadcasting system, and more particularly to scenario oriented information broadcasting system based on an Internet of Things.

BACKGROUND OF THE DISCLOSURE

Information technologies have become more and more widely used in education fields. More and more teachers teach students via an Internet of Things. When the teacher teaches the students how to write a complete code, the teacher triggers his computer to execute a broadcast program such that the complete code that is displayed on a screen of the computer of the teacher is synchronously displayed on screens of computers of the students. At this time, the students often use their own mobile phones to take pictures of the complete code on the screens of computers of the students. When the teacher instructs the students to practice writing code by themselves, the students directly copy the complete code from the pictures rather than write code by themselves. As a result, learning effects on the students are not good.

SUMMARY OF THE DISCLOSURE

In response to the above-referenced technical inadequacies, the present disclosure provides a scenario oriented information broadcasting system based on an Internet of Things. The scenario oriented information broadcasting system based on the Internet of Things includes a first electronic device and a plurality of second electronic devices. The first electronic device is configured to provide a plurality of first broadcast channels on an application and provide different first broadcast information respectively in the first broadcast channels via the Internet of Things. A first selection tool is dragged to select a region in which all or parts of contents of the first broadcast information in one of the first broadcast channels are displayed on the first electronic device based on a teaching scenario. The second electronic devices are connected to the first electronic device. An application is installed on each of the second electronic devices. When a user intends to be logged into the application on each of the second electronic devices, each of the second electronic devices is identified by the first electronic device. After each of the second electronic devices is successfully identified, each of the second electronic devices is permitted to subscribe each of the first broadcast channels on the application via the Internet of Things, and then obtains and broadcasts all or parts of the contents of the first broadcast information that are selected on the first electronic device. The first electronic device issues a first subscription instruction to each of the second electronic devices to subscribe each of the second electronic devices, and then receives a first learning command issued by each of the second electronic devices.

In certain embodiments, remaining parts of the contents of the first broadcast information that are not selected are replaced with a first blank region, such that the first blank region but not the contents of the first broadcast information that are not selected is broadcasted to and displayed on each of the second electronic devices. Answers are filled in the first blank region on each of the second electronic devices to generate a first online answer sheet, according to the contents of the first broadcast information that are selected by the first selection tool and displayed on each of the second electronic devices. The first electronic device compares contents of the first online answer sheet with the contents of the first broadcast information in the one of the first broadcast channels.

In certain embodiments, each of the second electronic devices provides a plurality of second broadcast channels on the application and provides different second broadcast information respectively in the second broadcast channels via the Internet of Things. A second selection tool is dragged to select a region in which all or parts of contents of the second broadcast information in one of the second broadcast channels are displayed on the second electronic device based on the teaching scenario. Each of the second electronic devices issues a second subscription instruction to the first electronic device to subscribe the first electronic device, and then receives a second learning command issued by the first electronic device.

In certain embodiments, remaining parts of the contents of the second broadcast information that are not selected are replaced with a second blank region, such that the second blank region but not the contents of the second broadcast information that are not selected is broadcasted to and displayed on the first electronic device. Answers are filled in the second blank region on the first electronic device to generate a second online answer sheet, according to the contents of the second broadcast information that are selected and displayed on the first electronic device. The second electronic device compares contents of the second online answer sheet with the contents of the second broadcast information in the one of the second broadcast channels.

In certain embodiments, when the first electronic device subscribes one of the second broadcast channels and requests each of the second electronic devices to broadcast first issue information, each of the second electronic devices determines an arrangement, a display style and an order of contents of the first issue information displayed on each of the second electronic devices based on an authority granted to the first electronic device.

In certain embodiments, the first electronic device subscribes one of the second broadcast channels. The first electronic device requests the first electronic device, one of the second electronic devices or a third electronic device to broadcast first issue information when the third electronic device meets a first specified condition.

In certain embodiments, when the second electronic devices subscribe one of the first broadcast channels and respectively request the first electronic device to broadcast different second issue information, the first electronic device determines an arrangement, a display style and an order of the second issue information of the second electronic devices displayed on the first electronic device based on authorities granted to the second electronic devices.

In certain embodiments, each of the second electronic devices subscribes one of the first broadcast channels. Each of the second electronic devices requests the first electronic device, one of the second electronic devices or the third electronic device to broadcast second issue information when the third electronic device meets a second specified condition.

In certain embodiments, each of the second electronic devices subscribes one of the first broadcast channels. The first electronic device sequentially broadcasts contents of the first broadcast information in the one of the first broadcast channels. Each of the second electronic devices requests the first electronic device to output a first reminder message to the second electronic device, to remind a user of the second electronic device that the first electronic device is ready to broadcast or is broadcasting one of the contents of the first broadcast information that is designated by each of the second electronic devices.

In certain embodiments, the first electronic device subscribes a second broadcast channel provided by each of the second electronic devices. Each of the second electronic devices sequentially broadcasts contents of second broadcast information in the second broadcast channel. The first electronic device requests each of the second electronic devices to output a second reminder message to the first electronic device, to remind the user of the first electronic device that the second electronic device is ready to broadcast or is broadcasting one of the contents of the second broadcast information that is designated by the first electronic device.

As described above, a conventional information broadcasting system only allows the user to broadcast or issue all of the contents of information. However, the present disclosure provides the scenario oriented information broadcasting system, which allows the user to only select and broadcast or issue parts of the contents of information to facilitate interactions between users, for example, the teacher can provide opportunities for the students to practice by themselves, thereby improving learning of the students in the course.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
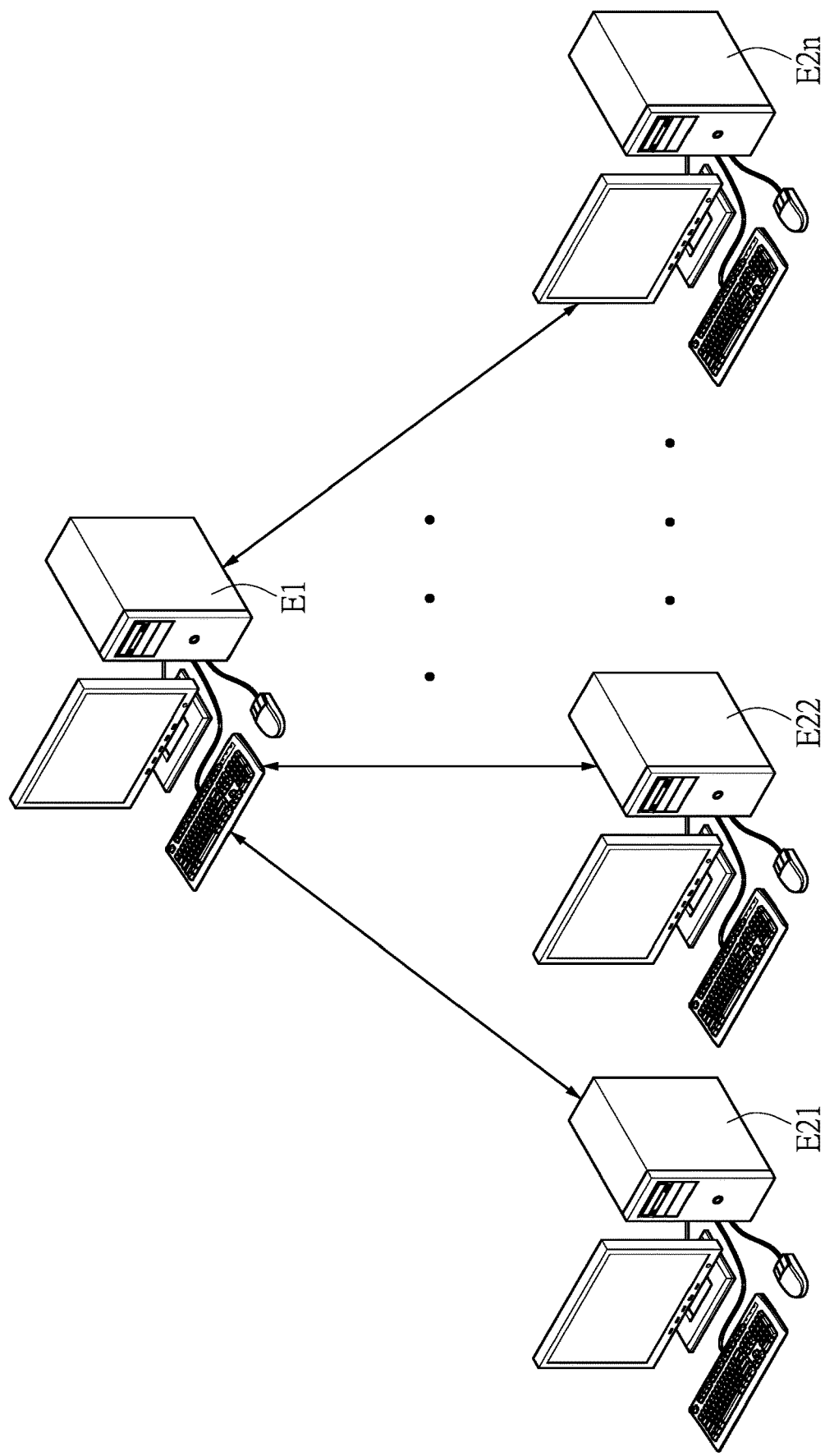
FIG. 1 is a schematic diagram of a scenario oriented information broadcasting system based on an Internet of Things according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
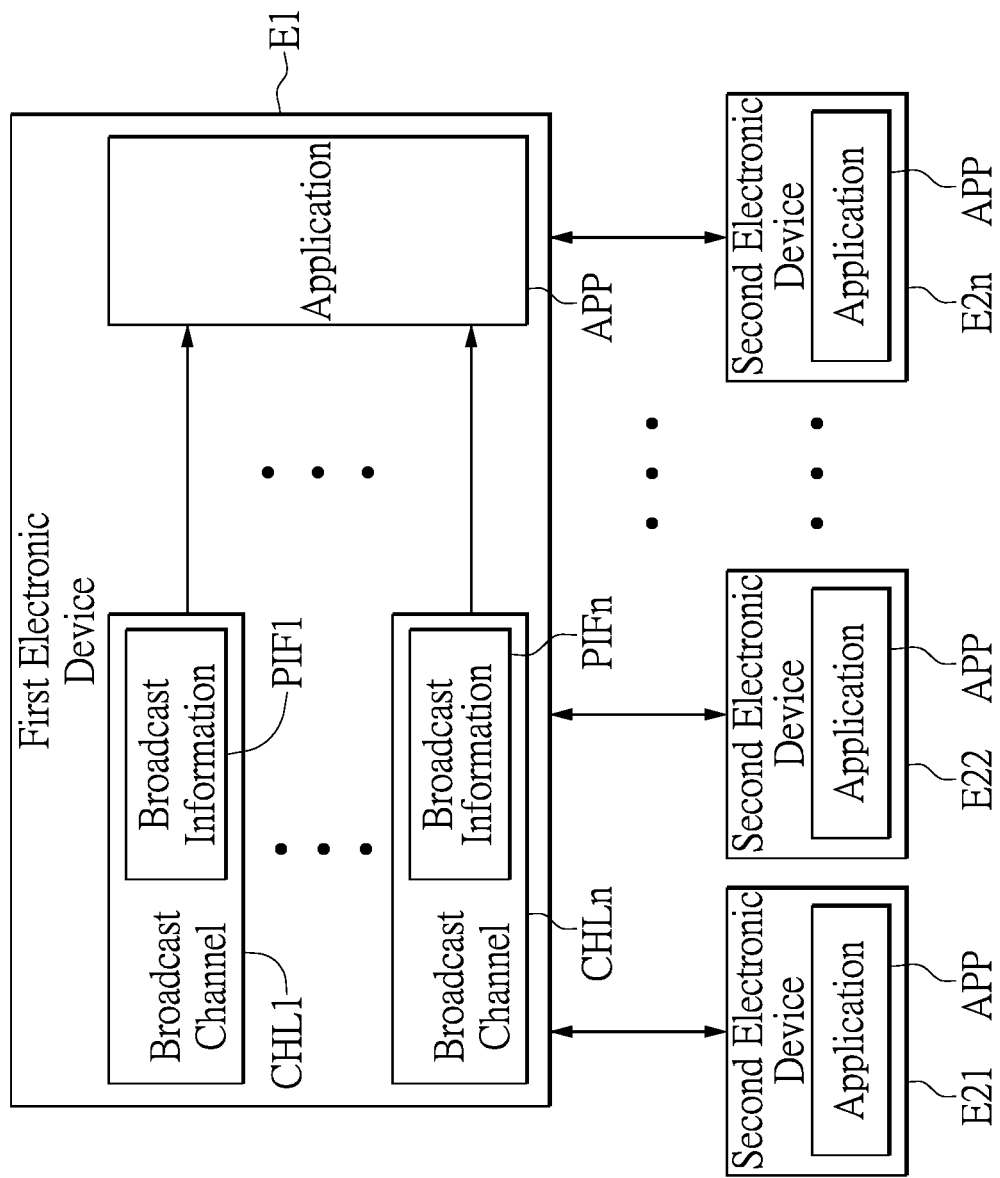
FIG. 2 is a block diagram of the scenario oriented information broadcasting system in which a first electronic device provides first broadcast information on an application according to the embodiment of the present disclosure.
Figure 3:
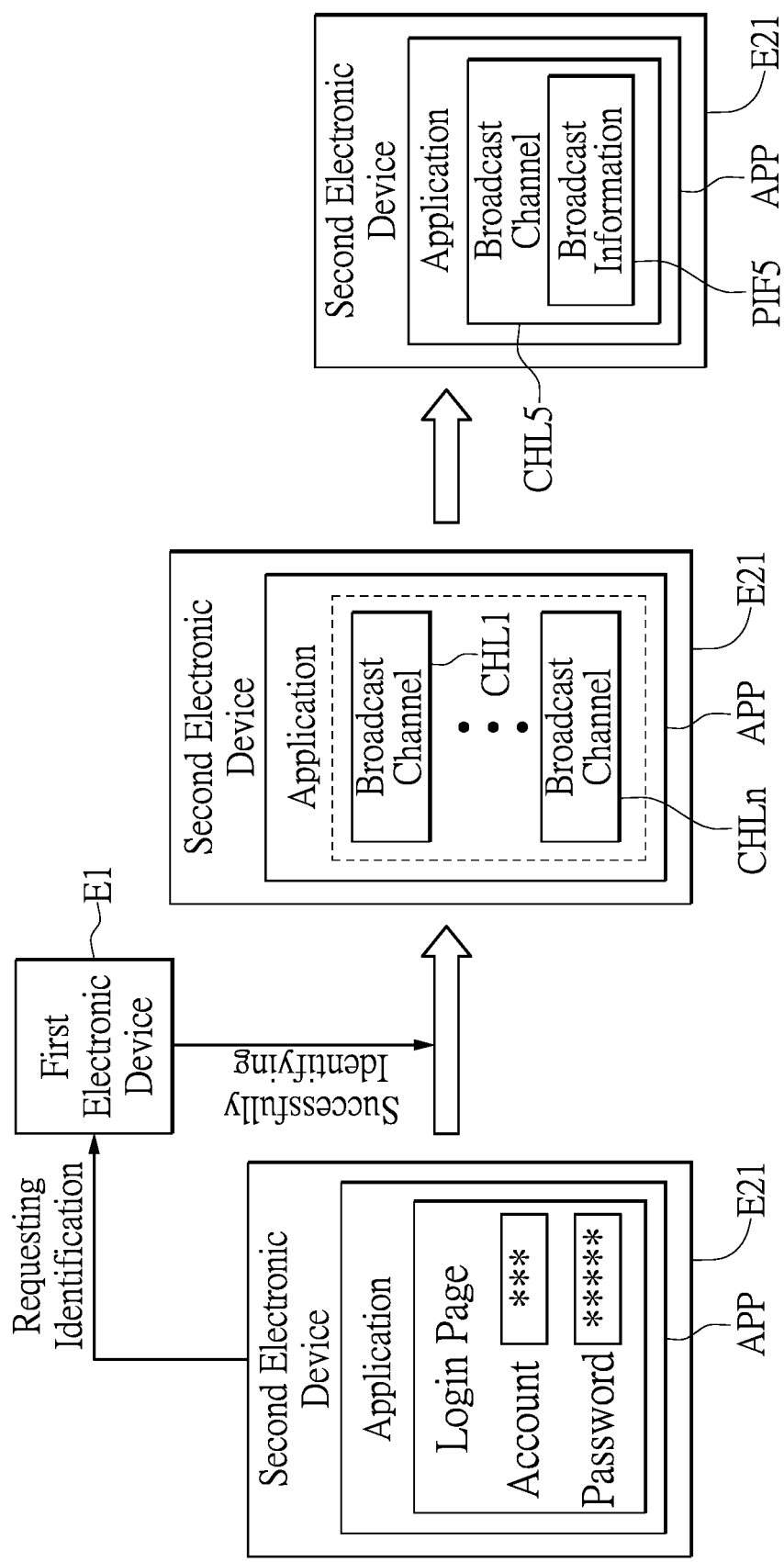
FIG. 3 is a block diagram of one of second electronic devices on which a user is logged into the application, first broadcast channels are subscribed and the first broadcast information is obtained in the scenario oriented information broadcasting system according to the embodiment of the present disclosure.

Reference is made to FIGS. 1 to 3, in which FIG. 1 is a schematic diagram of a scenario oriented information broadcasting system based on an Internet of Things according to an embodiment of the present disclosure, FIG. 2 is a block diagram of the scenario oriented information broadcasting system in which a first electronic device that provides first broadcast information on an application according to the embodiment of the present disclosure, and FIG. 3 is a block diagram of one of second electronic devices on which a user is logged into the application, first broadcast channels are subscribed and the first broadcast information is obtained in the scenario oriented information broadcasting system according to the embodiment of the present disclosure.

As shown in FIG. 1, in the embodiment, the scenario oriented information broadcasting system based on the Internet of Things includes a first electronic device E1 and a plurality of second electronic devices E21 to E2n. The first electronic device E1 and the second electronic devices E21 to E2n may be mobile devices such as mobile phones, tablet computers, desktop computers or other electronic devices, and the number of the second electronic devices E21 to E2n may be determined according to actual requirements, but the present disclosure is not limited thereto. As shown in FIG. 2, an application APP or a software agent may be installed on each of the first electronic device E1 and the second electronic devices E21 to E2n. Each of the second electronic devices E21 to E2n may subscribe the first electronic device E1, broadcast the first broadcast information of the first electronic device E1 and issue first issue information on the application APP via the Internet of Things. The first electronic device E1 may subscribe the second electronic devices E21 to E2n, broadcast second broadcast information of the second electronic devices E21 to E2n and issue second issue information on the application APP via the Internet of Things.

As shown in FIG. 2, the first electronic device E1 may provide a plurality of first broadcast channels CHL1 to CHLn on the application APP, and provide different first broadcast information PIF1 to PIFn respectively in the first broadcast channels CHL1 to CHLn, based on different teaching scenarios, via the Internet of Things.

As shown in FIG. 3, the users may input identification information such as account numbers and passwords in a login page of the application APP in predetermined regions or other places by using the second electronic devices E21 to E2n. In practice, the first electronic device E1 may be requested to identify other identification information such as device identification codes of the second electronic devices E21 to E2n.

Only specific users may be authorized to use their own electronic devices to broadcast scenario oriented information. After the above-mentioned identification information is successfully identified, the users of the second electronic devices E21 to E2n are permitted to use all or some of the first broadcast channels CHL1 to CHLn. The users of the second electronic devices E21 to E2n may subscribe any one of the first broadcast channels CHL1 to CHLn that are authorized to the users on the application APP through the Internet of Things according to desired teaching scenarios of the users, or learning states or abilities of the users. For example, the second electronic devices E21 to E2n subscribe the first broadcast channel CHL5 to obtain the first broadcast information PIF5 that is provided in the first broadcast channel CHL5 by the first electronic device E1, and then broadcast the first broadcast information PIF5.

After the identification information of (the users of) the second electronic devices E21 to E2n is successfully identified by the first electronic device E1, the first electronic device E1 selects parts or all of contents of first broadcast information PIF1 to PIFn, according to a teaching scenario requirement of a user of the first electronic device E1 that provides the first broadcast information PIF1 to PIFn or teaching scenario requirements of the users of the second electronic devices E21 to E2n that are logged into the application APP and subscribe the first electronic device E1. If a scenario event regularly occurs in the teaching scenario requirements, an overall state of the users that subscribe the first electronic device E1 or are logged into the application APP is analyzed based on the scenario event that regularly occurs to generate an analysis result by using artificial intelligence. All or parts of the contents of the first broadcast information PIF1 to PIFn are selected according to the analyzed result.

Alternatively, any user is allowed to broadcast the scenario oriented information anywhere after the user subscribes the contents of the first broadcast information PIF1 to PIFn without being logged into the application APP. For example, after the second electronic devices E21 to E2n subscribe the first broadcast channel CHL5 in predetermined regions or other places, the second electronic devices E21 to E2n can obtain and broadcast the first broadcast information PIF5 in the first broadcast channel CHL5. Under this condition, the application APP does not need to be logged into on the second electronic devices E21 to E2n.

Conversely, after the first electronic device E1 subscribes the second electronic devices E21 to E2n in predetermined regions or other places, second issue information PL1 to PLn is allowed to be issued on the second electronic devices E21 to E2n. If all of the second electronic devices E21 to E2n are not instructed to broadcast the second issue information PL1 to PLn, the second issue information PL1 to PLn may be issued on the first electronic device E1 after the first electronic device E1 subscribes the second electronic devices E21 to E2n.

When the second electronic device E21 subscribes the first broadcast channel CHL5, the first electronic device E1 is permitted to control the second electronic device E21. For example, the first electronic device E1 is permitted to control the second electronic device E21 to display or play the first broadcast information PIF5 in the first broadcast channel CHL5 on a screen of the second electronic device E21.

For example, two or more of the second electronic devices E21 to E2n such as the mobile phones and the desktop computers may be owned by each of students. When a teacher teaches the students how to write code in a course, the teacher may guide the students to use the second electronic devices E21 to E2n to subscribe the first broadcast channels CHL1 to CHLn. When the second electronic devices E21 to E2n subscribe the first broadcast channels CHL1 to CHLn, the first electronic device E1 is permitted to control the second electronic devices E21 to E2n by the teacher. For example, when the teacher teaches the students to write the code or the students try to write the code by themselves, the teacher may provide the first broadcast information PIF1 to PIFn to the second electronic devices E21 to E2n and control the second electronic devices E21 to E2n to broadcast the first broadcast information PIF1 to PIFn by using the first electronic device E1. In addition, the teacher may limit operation authorities of the students for the second electronic devices E21 to E2n by using the first electronic device E1.

In practice, the second electronic devices E21 to E2n may perform the same operations that are performed by the first electronic device E1 such that more interactions are occurred between the second electronic devices E21 to E2n and the first electronic device E1. The first electronic device E1 may be owned by the teacher. The teacher may use the first electronic device E1 to issue a first subscription instruction to each of the second electronic devices E21 to E2n to subscribe each of the second electronic devices E21 to E2n. Then, the first electronic device E1 may receive a first learning command issued by each of the second electronic devices E21 to E2n. The first learning command may indicate learning state information of the students.

Specific groups may only be authorized to use their own electronic devices to broadcast the scenario oriented information. After the second electronic devices E21 to E2n are successfully identified by the first electronic device E1, the second electronic devices E21 to E2n may be organized or grouped into different groups. For example, each of the students is grouped with other of the students at the same level, but not grouped with other of the students at different levels. The first broadcast information PIF1 to PIFn is provided to which one or more of the groups into which the second electronic devices E21 to E2n are grouped according to the level of the students of each of the groups. In other words, each of the second electronic devices E21 to E2n receives which one or more of the first broadcast information PIF1 to PIFn according to the level of the students of each of the groups.

Figure 4A:
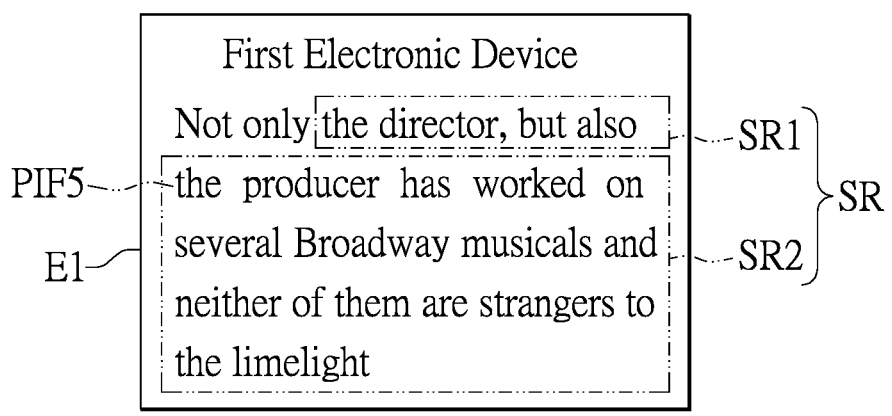
FIG. 4A is a block diagram of the first electronic device of the scenario oriented information broadcasting system on which parts of contents of the first broadcast information are being selected according to the embodiment of the present disclosure.
Figure 4B:
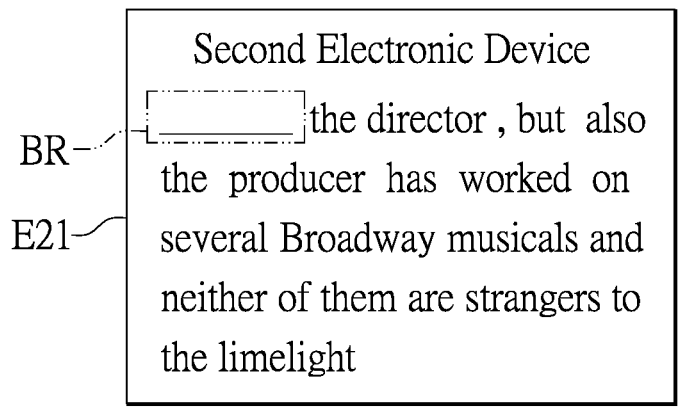
FIG. 4B is a block diagram of the second electronic device of the scenario oriented information broadcasting system on which the contents of the first broadcast information that are selected on the first electronic device is broadcasted according to the embodiment of the present disclosure.

Reference is made to FIGS. 4A and 4B, in which FIG. 4A is a block diagram of the first electronic device of the scenario oriented information broadcasting system on which parts of contents of the first broadcast information are being selected, and FIG. 4B is a block diagram of the second electronic device of the scenario oriented information broadcasting system on which the contents of the first broadcast information that are selected on the first electronic device is broadcasted according to the embodiment of the present disclosure.

The first broadcast information PIF5 may include an English sentence shown in FIG. 4A and may be displayed on the first electronic device E1. It should be understood that, the first broadcast information PIF5 may include other English sentences, articles or codes, but the present disclosure is not limited thereto. The user may trigger the first electronic device E1 to drag and adjust a first selection tool SR to select a region in which parts of contents of the first broadcast information PIF5 are displayed (in an application) on a screen of the first electronic device E1. The first selection tool SR may include a first sub-selection block SR1 and a second sub-selection block SR2. Alternatively, parts of the contents of the first broadcast information PIF5 are selected and displayed on the screen of the first electronic device E1 by using Meta descriptions. The above operations may be manually or automatically triggered to be performed based on records of learning states or a teaching scenario analyzed by using the artificial intelligence.

As shown in FIG. 4A, in the sentence "Not only . . . But also", "But also" is selected, but "Not only" is not selected and left for the student to answer. Alternatively, parts of the codes are selected and provided to the student, and other parts of the codes are not selected and left for the student to write codes by themselves. Conversely, contents that are selected are not provided to the student, but contents that are not selected are provided to the student. For example, when three regions are selected, other regions except for the three regions are provided to the student.

As shown in FIG. 4B, the contents of the first broadcast information PIF5 that are selected or not selected by the first selection tool SR are replaced with a first blank region BR on the second electronic device E21. Alternatively, the contents of the first broadcast information PIF5 may be respectively selected by different first selection tools, and may be respectively displayed in subscenes and a primary scene on the second electronic device E21. The student may fill answers in the first blank region BR on the second electronic device E21 to generate a first online answer sheet according to the contents of the first broadcast information PIF5 that are broadcasted to the first electronic device E1.

The first electronic device E1 compares contents of the first online answer sheet with all of the contents of the first broadcast information to generate a comparison result. Then, the first electronic device E1 determines whether or not the contents of the answers that are filled by the student is the same as the contents that are not selected by the first selection tool SR according to the comparison result. The first electronic device E1 notifies the teacher whether not the answers of the student are correct, and provides the comparison result and correct answers to the second electronic device E21 of the students. Therefore, a good learning effect of the students interacting with the teacher can be realized.

Figure 5:
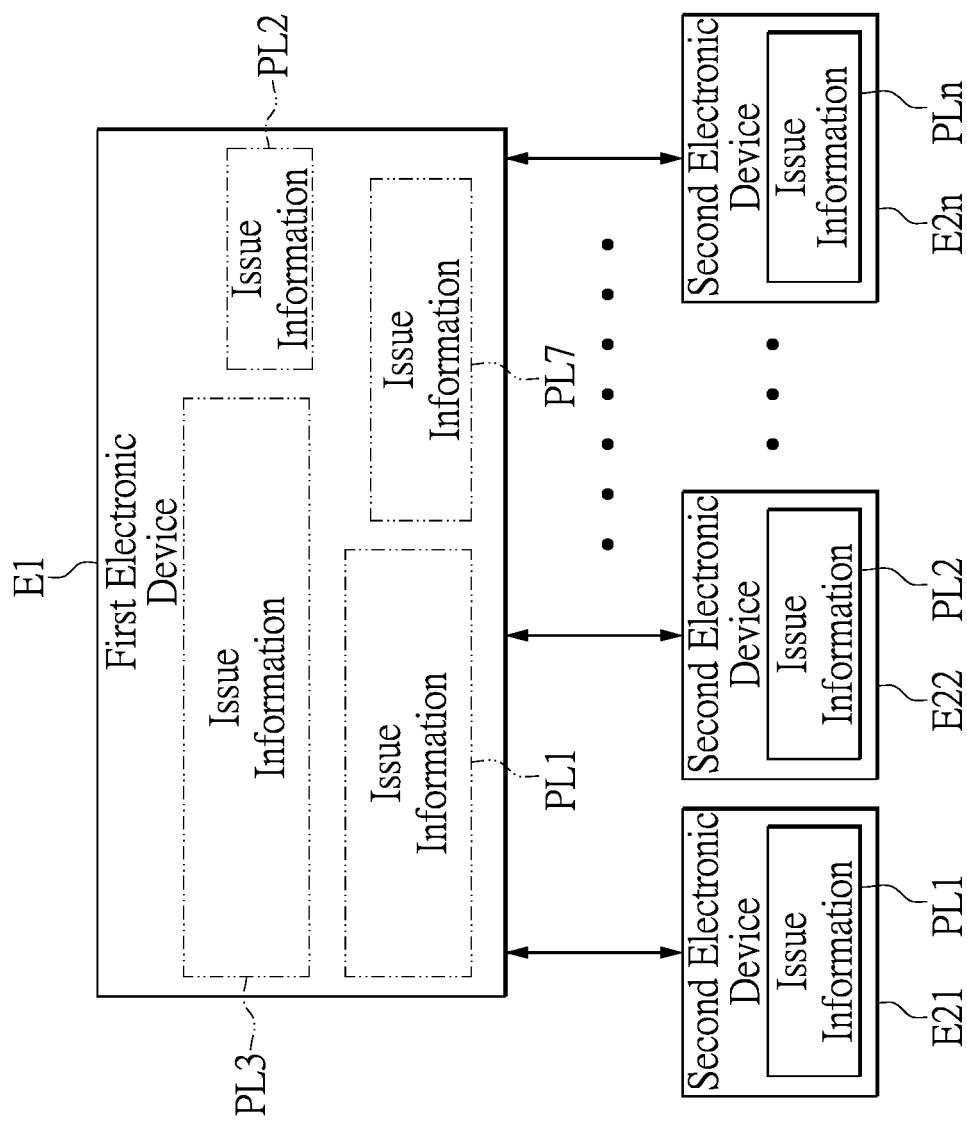
FIG. 5 is a block diagram of the scenario oriented information broadcasting system in which the second electronic devices provide second issue information to the first electronic device and requests the first electronic device to issue the second issue information according to the embodiment of the present disclosure.

Reference is made to FIG. 5, which is a block diagram of the scenario oriented information broadcasting system in which the second electronic devices provides second issue information to the first electronic device and requests the first electronic device to issue the second issue information according to the embodiment of the present disclosure.

As shown in FIG. 5, when each of the second electronic devices E21 to E2n intends to subscribe the first broadcast channels CHL1 to CHLn and request the first electronic device E1 to broadcast the second issue information PL1 to PLn, the first electronic device E1 identifies the second electronic devices E21 to E2n to determine whether or not each of the second electronic devices E21 to E2n is authorized.

After each of the second electronic devices E21 to E2n subscribes the first electronic device E1, the first electronic device E1 determines an arrangement, a display style and an order of contents of the second issue information PL1 to PLn displayed on the first electronic device E1 based on an authority granted to each of the second electronic devices E21 to E2n. For example, the contents of the second issue information PL1 to PLn are respectively displayed in subscenes and a primary scene, respectively displayed in divided scenes, or respectively displayed in different pages on the screen of the first electronic device E1. When the first electronic device E1 issues the second issue information PL1 to PLn that are subscribed by each of the second electronic devices E21 to E2n, the first electronic device E1 may output a first reminder message to each of the second electronic devices E21 to E2n to remind the users of the second electronic devices E21 to E2n.

For example, the first electronic device E1 may obtain or record an order that the second electronic devices E21 to E2n subscribe each of the first broadcast channels CHL1 to CHLn, an order that the second electronic devices E21 to E2n request the first electronic device E1 to issue the first broadcast channels CHL1 to CHLn, and identifies (such as members and visitors) of the users of the second electronic devices E21 to E2n. Accordingly, the first electronic device E1 may determine an order, positions and an arranging manner (such as an arranging manner of the subscenes and the primary scene, or the divided scenes, as described above) that the second issue information PL1 to PLn are displayed on the screen of the first electronic device E1, and a ratio of areas that are respectively occupied by the second issue information PL1 to PLn on the screen of the first electronic device E1.

For example, the second electronic devices E21 to E2n may only select parts of the contents of the second issue information PL6, and the first electronic device E1 only broadcasts the selected contents.

In practice, the second electronic devices E21 to E2n may establish a common communication channel such as an online discussion board, an electronic whiteboard or an online chat room, according to the second issue information PL1 to PLn provided by the first electronic device E1. The users may interact and discuss the second issue information PL1 to PLn on a specific topic with each other in the common communication channel by using the second electronic devices E21 to E2n.

Figure 6A:
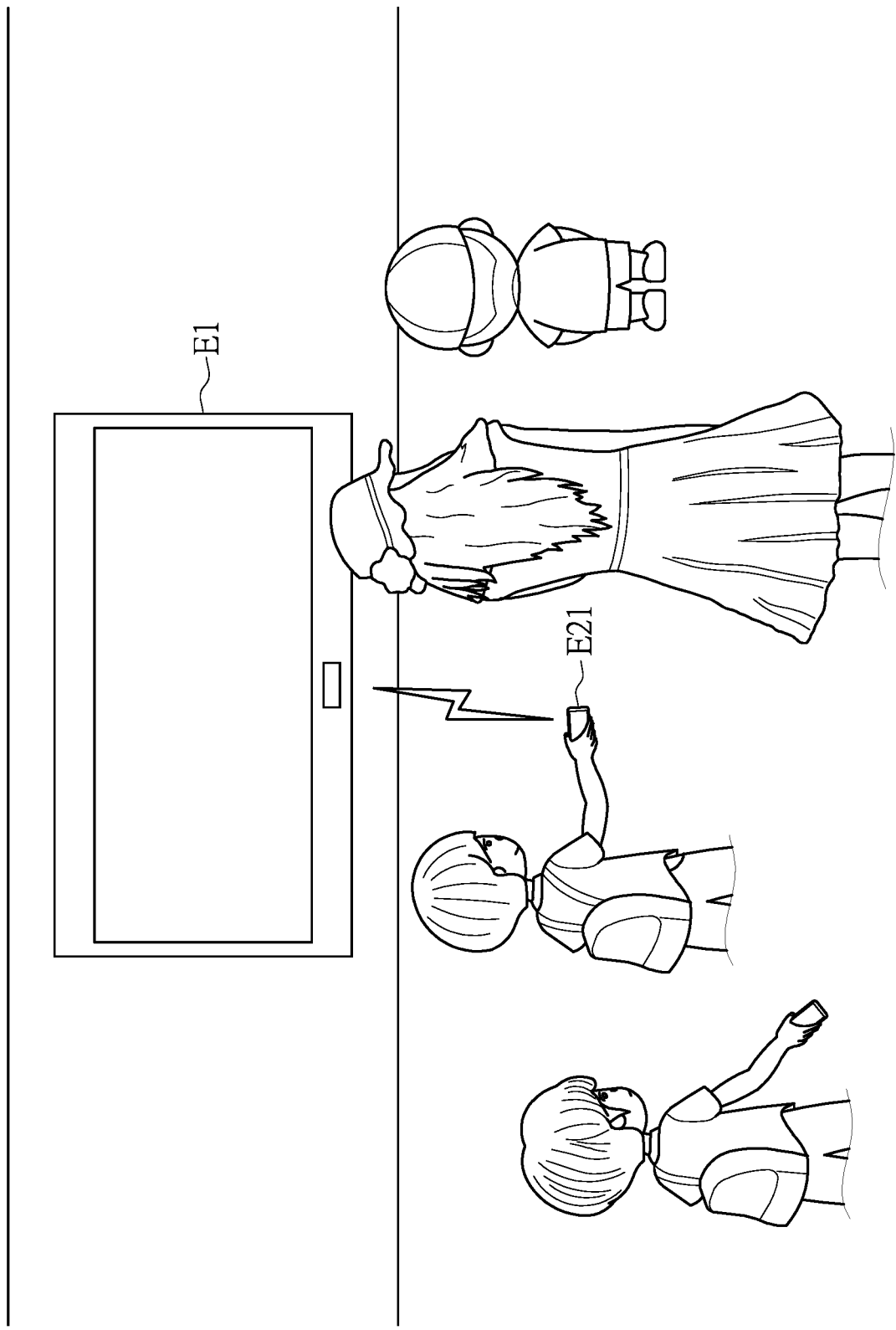
FIG. 6A is a schematic diagram of the first electronic device being subscribed by the second electronic device in the scenario oriented information broadcasting system according to the embodiment of the present disclosure.
Figure 6B:
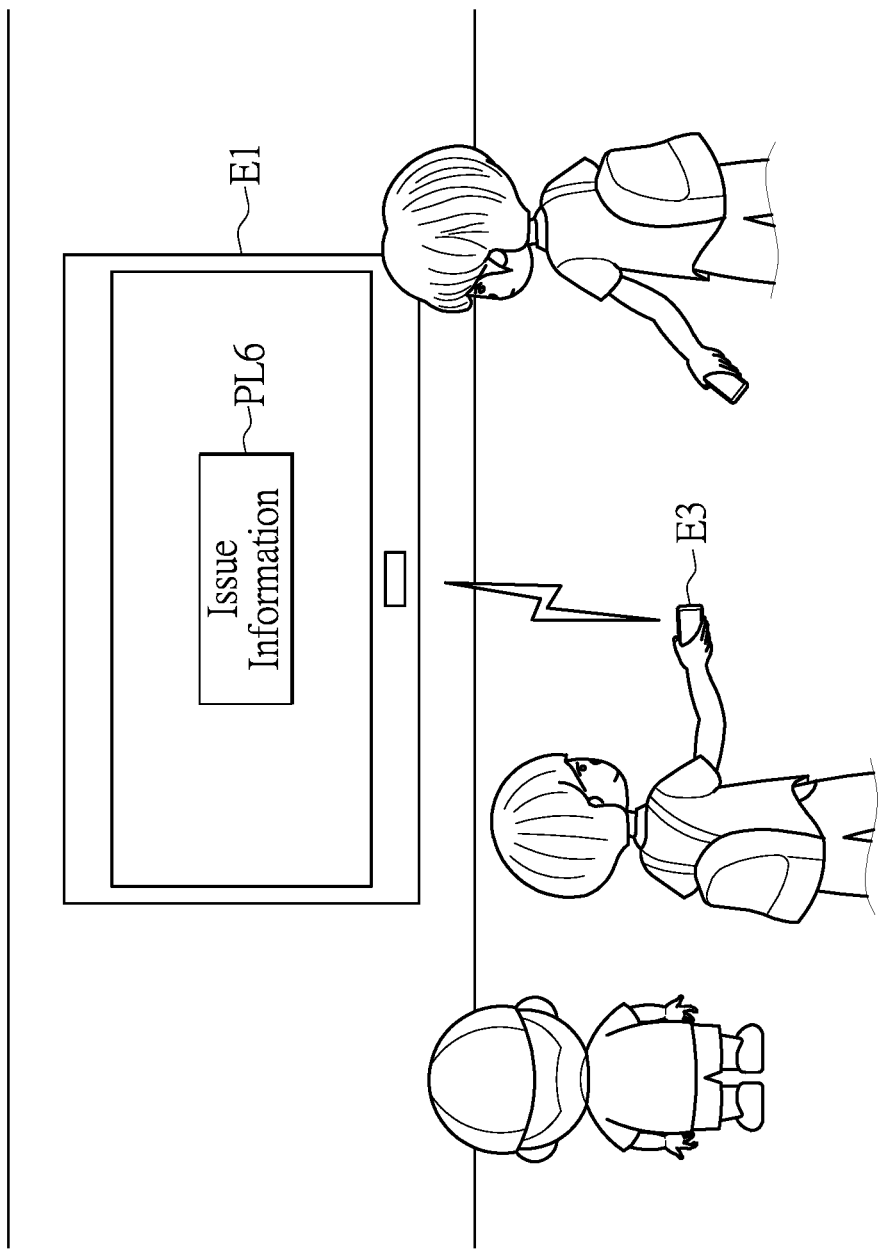
FIG. 6B is a schematic diagram of the first electronic device that is broadcasting the second issue information when a third electronic device passes in the vicinity of the first electronic device in the scenario oriented information broadcasting system according to the embodiment of the present disclosure.

Reference is made to FIGS. 6A and 6B, in which FIG. 6A is a schematic diagram of the first electronic device being subscribed by the second electronic device in the scenario oriented information broadcasting system according to the embodiment of the present disclosure, and FIG. 6B is a schematic diagram of the first electronic device that is broadcasting issue information when a third electronic device passes in the vicinity of the first electronic device in the scenario oriented information broadcasting system according to the embodiment of the present disclosure.

As shown in FIG. 6A, the second electronic device E21 subscribes the first broadcast channel of the first electronic device E1, and provides and updates identification information (such as a unique identification code and position information) of a third electronic device E3 to the first electronic device E1 in real time. The second electronic device E21 requests the first electronic device E1 to broadcast the second issue information PL6 when the third electronic device E3 meets a second specified condition. For example, when the third electronic device E3 passes the vicinity of the first electronic device E1, the first electronic device E1 broadcasts the second issue information PL6.

As a result, as shown in FIG. 6B, when the third electronic device E3 passes the vicinity of the first electronic device E1, the first electronic device E1 broadcasts the second issue information PL6, or provides the second issue information PL6 to the third electronic device E3 and instructs the third electronic device E3 to broadcast the second issue information PL6.

As described above, the second electronic device E21 subscribes the first broadcast channel to request the first electronic device E1 to broadcast the second issue information PL6 when the third electronic device E3 meets the second specified condition, but the present disclosure is not limited thereto. It should be understood that, the above-mentioned operations performed by the first electronic device E1, the second electronic device E21 and the third electronic device E3 are only exemplified herein, and the present disclosure is not limited thereto.

In practice, the second electronic device E21 may subscribe the first broadcast channel of the first electronic device E1 and request the first electronic device E1 to broadcast the second issue information PL6 or other issue information in the subscribed first broadcast channel. In addition or alternatively, the second electronic device E21 may subscribe the first broadcast channel of the first electronic device E1, and request the second electronic device E21 to broadcast the second issue information PL6 or other issue information. In addition or alternatively, the second electronic device E21 may subscribe the first broadcast channel of the first electronic device E1, and may request one or more of the first electronic device E1, the second electronic device E21 and the third electronic device E3 to broadcast the second issue information PL6 when the third electronic device E3 meets the second specified condition. If necessary, the first electronic device E1 may be interchangeably used with the second electronic device E21 and the third electronic device E3 in the embodiment.

Figure 7:
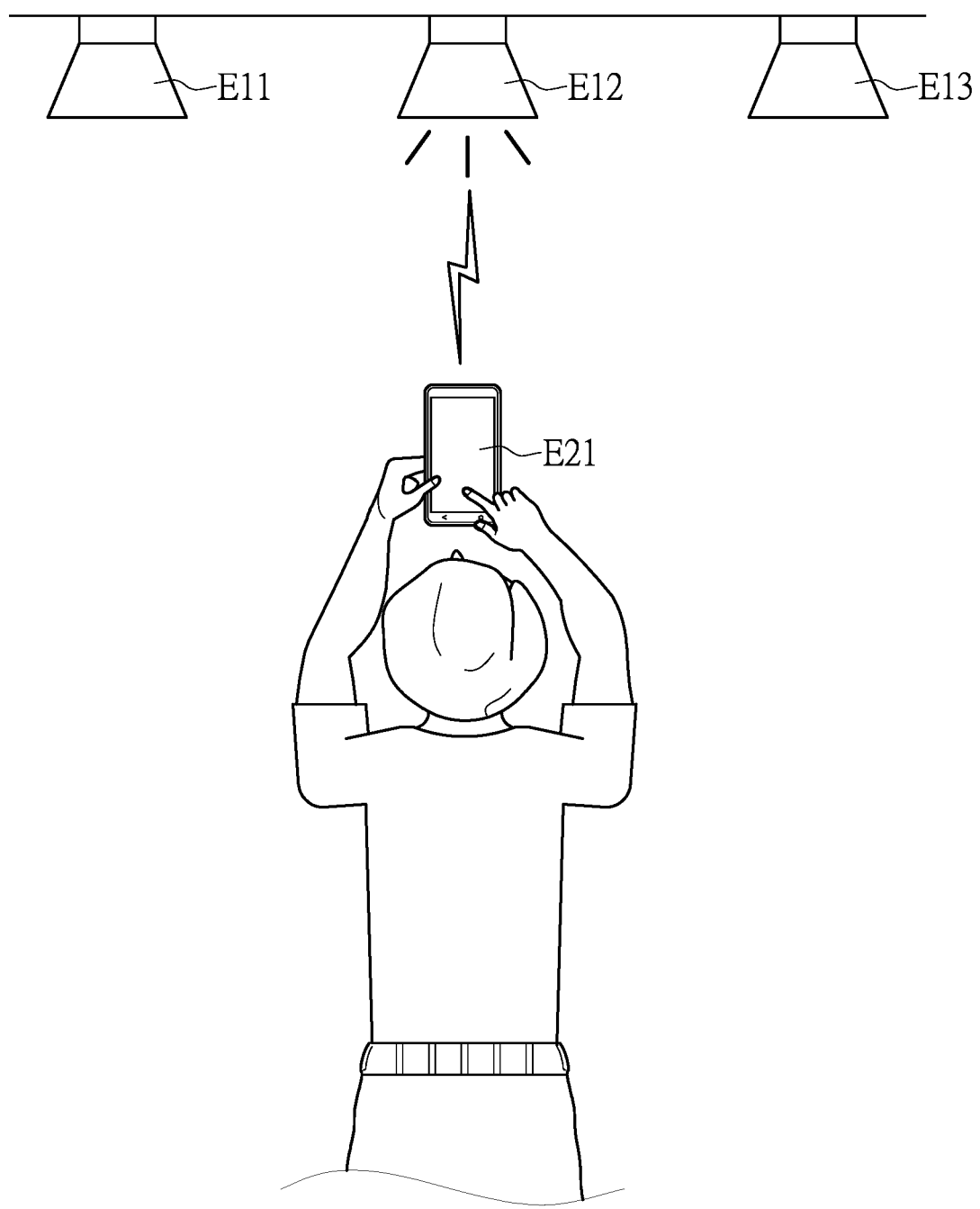
FIG. 7 is a schematic diagram of chandeliers that are being subscribed and then controlled to emit light by a mobile phone using the scenario oriented information broadcasting system according to the embodiment of the present disclosure.

Reference is made to FIG. 7, which is a schematic diagram of chandeliers that are being subscribed and then controlled to emit light by a mobile phone using the scenario oriented information broadcasting system according to the embodiment of the present disclosure.

The scenario oriented information may only be allowed to be broadcasted in specific regions. The second electronic device E21 such as the mobile phone may subscribe the first broadcast channel provided by first electronic device E12 such as chandeliers. As a result, the second electronic device E21 is permitted to request the first electronic device E12 to broadcast the first broadcast information of the first broadcast channel in one of the specific regions. For example, when the second electronic device E21 is located right below or near one of the first electronic devices E11, E12, E13, the user may manually trigger the second electronic device E21 to control the one of the first electronic devices E11, E12, E13 to emit a light signal, or the one of the first electronic devices E11, E12, E13 automatically emits the light signal. A space where the user of the second electronic device E21 is located is illuminated by the light signal. The light signal is the first broadcast information.

Figure 8:
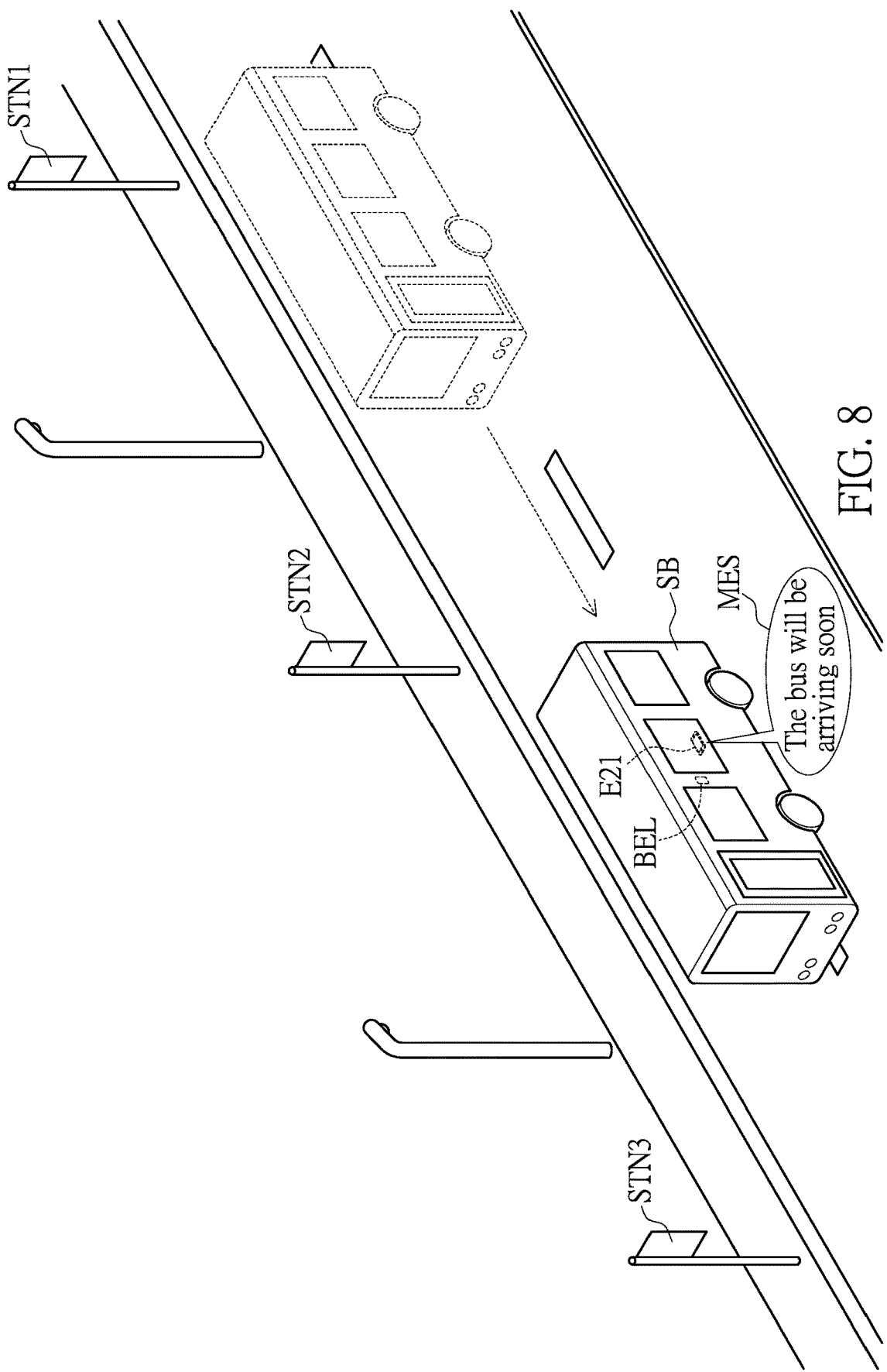
FIG. 8 is a schematic diagram of a bus inside which a bell is being turned on automatically and a user is reminded by the mobile phone by using the scenario oriented information broadcasting system when the bus will be arriving at a destination soon according to the embodiment of the present disclosure.

Reference is made to FIG. 8, which is a schematic diagram of a bus inside which a bell is being turned on automatically and a user is reminded by the mobile phone by using the scenario oriented information broadcasting system when the bus will be arriving at a destination soon according to the embodiment of the present disclosure.

As shown in FIG. 8, a bus SB is driven on a road. A user may get on the bus SB from a position near a bus stop sign STN1. After the user gets on the bus SB, the user uses an application on the second electronic device E21 provided by the first electronic device E1 of the bus SB.

The user may trigger the second electronic device E21 to subscribe the first broadcast channel provided on the application according to information of the bus SB such as an identification number of the bus SB and a path along which the bus will be driven on the road. The user may trigger the second electronic device E21 to request the first electronic device E1 to output a first reminder message MES to the second electronic device E21 to remind the user of the second electronic device E21 to get ready to get off the bus SB when the bus SB will be arriving at the destination soon or has arrived at the destination such as a bus stop sign STN3. At the same time, a bell BEL may be automatically turned on rather than manually pressed by the user such that the bell BEL is triggered to emit light for reminding the user, thereby effectively improving convenience and satisfaction of the user.

Figure 9:
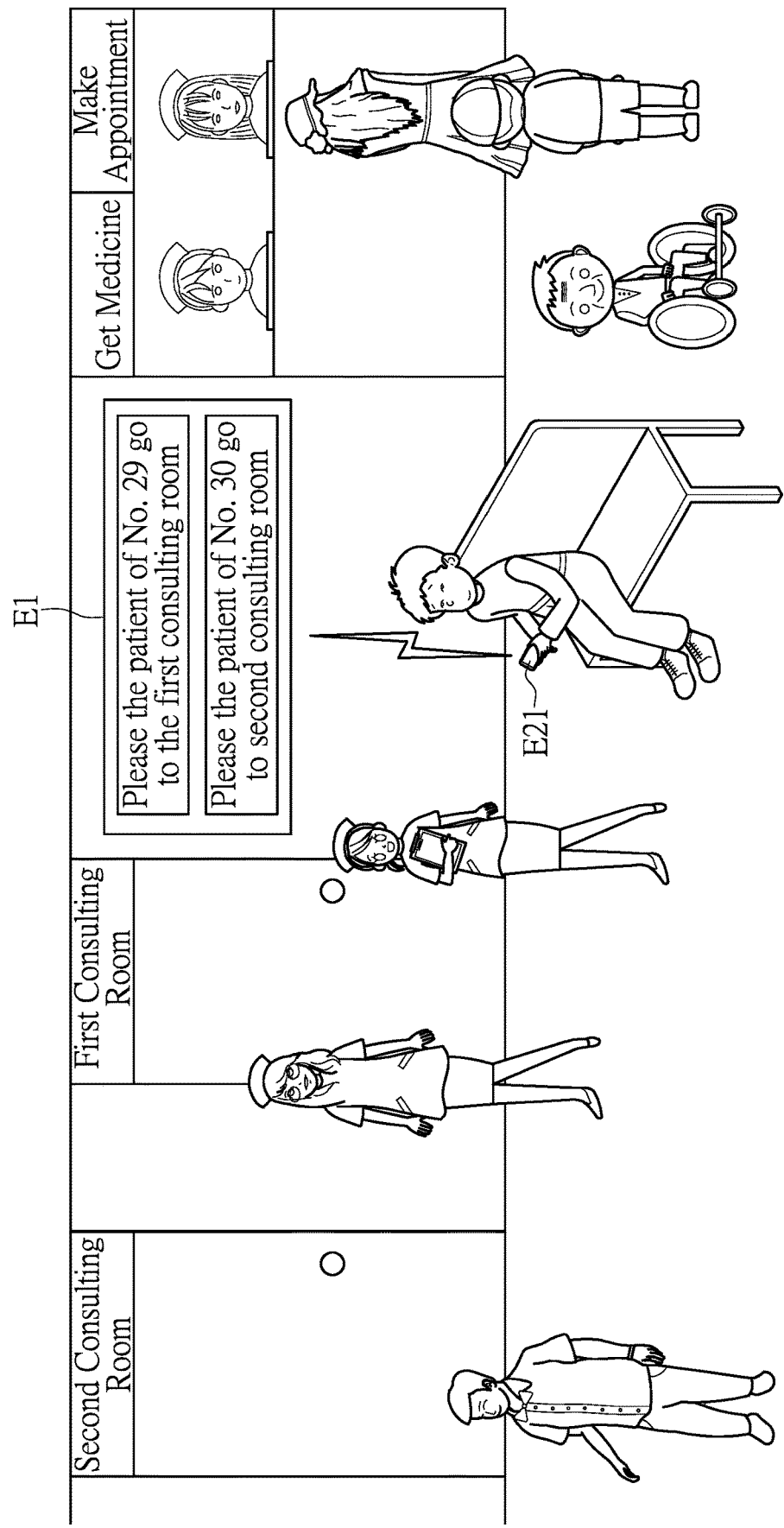
FIG. 9 is a schematic diagram of a clinic in which a patient is reminded by the mobile phone using the scenario oriented information broadcasting system when an appointment number of the patient will be played soon or has been played on the first electronic device according to the embodiment of the present disclosure.

Reference is made to FIG. 9, which is a schematic diagram of a clinic in which a patient is reminded by the mobile phone using the scenario oriented information broadcasting system when an appointment number of the patient will be played soon or has been played on the first electronic device according to the embodiment of the present disclosure.

The patient may make an appointment with a doctor to obtain the appointment number in an appointment counter of the clinic. When the appointment number is played on the first electronic device E1, the patient must walk into a consulting room on time such that the patient is diagnosed and treated by the doctor in the consulting room. Therefore, the patient must stay in the clinic all the time and look at the first electronic device E1 to determine whether or not the appointment number of the patient is played on the first electronic device E1. When the patient makes several appointments with doctors of different divisions to obtain several appointment numbers, the patient needs to go to the divisions and look at the first electronic devices E1 that are respectively disposed in the divisions to determine whether or not any one of the appointment numbers of the patient is played on the first electronic device E1. However, different patients may have different health conditions, and different times are required for different doctors to diagnose and treat different patients. Therefore, it is difficult for the patient to predict a time that the patient should go to each of consulting rooms and prevent the patient from waiting for a long time in each of the divisions. If the patient does not arrive at each of the consulting rooms when the appointment number of the patient is played on the first electronic device E1, the patient is requested to wait for a period of times. When many patients are waiting to be diagnosed and treated, the patients cannot move far away from the first electronic devices E1 for a long time to prevent them from missing the appointments, which is very inconvenient for the patients and family members of the patients.

In order to solve the above-mentioned problem, as shown in FIG. 9, in the embodiment, the first electronic device E1 provides two first broadcast channels that are respectively used for a first consulting room and a second consulting room. In practice, the first electronic device E1 may only provide one first broadcast channel that is used for both of the first consulting room and the consulting room. In the clinic, the first electronic device E1 may sequentially broadcast several appointment numbers. In addition, the first electronic device E1 may broadcast clinic information, health education videos, doctor information, room numbers, division information and other first broadcast information, but the present disclosure is not limited thereto. It should be understood that, the scenario oriented information broadcasting system of the embodiment may be applied to large hospitals or other places. The number of the first broadcast channels and the contents of the first broadcast information provided in the first broadcast channels may depend on the division information, diagnostic category information and other information of the hospitals.

As shown in FIG. 9, after the patient makes the appointment with the doctor to obtain the appointment number, the patient may download and install an application of the clinic on the second electronic device E21. Then, the patient may use the second electronic device E21 to subscribe the first broadcast channel provided by the first electronic device E1. The patient may trigger the second electronic device E21 to open the application to obtain the appointment number that is being played on the first electronic device E1 and other related information that is provided in the first broadcast channel by the first electronic device E1. Under this condition, the patient still can learn the appointment number that is being played on the first electronic device E1 by using the second electronic device E21 even if the patient moves far away from the first electronic device E1, for example, moves to a place outside the clinic.

Before the patient uses the second electronic device E21 to subscribe the first broadcast channel, the patient needs to input his appointment number on the application by using the second electronic device E21. Alternatively, the patient may input personal identification information such as an account, a password, an identity number and a name on the application by using the second electronic device E21. When the appointment number or the personal identification information of the patient is successfully identified, the patient is logged into the application. If the patient is logged into the application with the personal identification information, the application automatically obtains the appointment number of the patient from a patient management system according to the personal identification information of the patient.

The patient may trigger the second electronic device E21 to request the first electronic device E1 to broadcast the contents of the first broadcast information. The appointment numbers of the patients are sequentially broadcasted on the first electronic device E1. When the first electronic device E1 is ready to broadcast or is broadcasting the content of the first broadcast information such as one of the appointment numbers that is designated by the second electronic device E21, the first electronic device E1 may output a first reminder message to the second electronic device E21 to remind the patient, thereby preventing the patient from missing the appointment. For example, if the appointment number of the patient is No. 31, the first electronic device E1 reminds the patient when the appointment number that is being broadcasted on the first electronic device E1 is No. 30 as shown in FIG. 9.

As shown in FIG. 9, only one first electronic device E1 is disposed in one division. However, in practice, the first electronic devices E1 may respectively be disposed in a plurality of divisions of the hospital. The patient may subscribe the first broadcast channel of the first electronic device E1 in one of the divisions, or subscribe the first broadcast channels of the first electronic devices E1 respectively in the divisions.

After the patient subscribes the first broadcast channel, the patient is permitted to determine an arrangement of the contents of the first broadcast information broadcasted on the screen of the second electronic device E21. For example, the patient may use the second electronic device E21 to drag the first broadcast information on a topic that is subscribed by the patient into one of sub-regions divided from a subscription information display region on the screen of the second electronic device E21, and trigger the second electronic device E21 to broadcast the contents of the first broadcast information in the one of the sub-regions.

Figure 10:
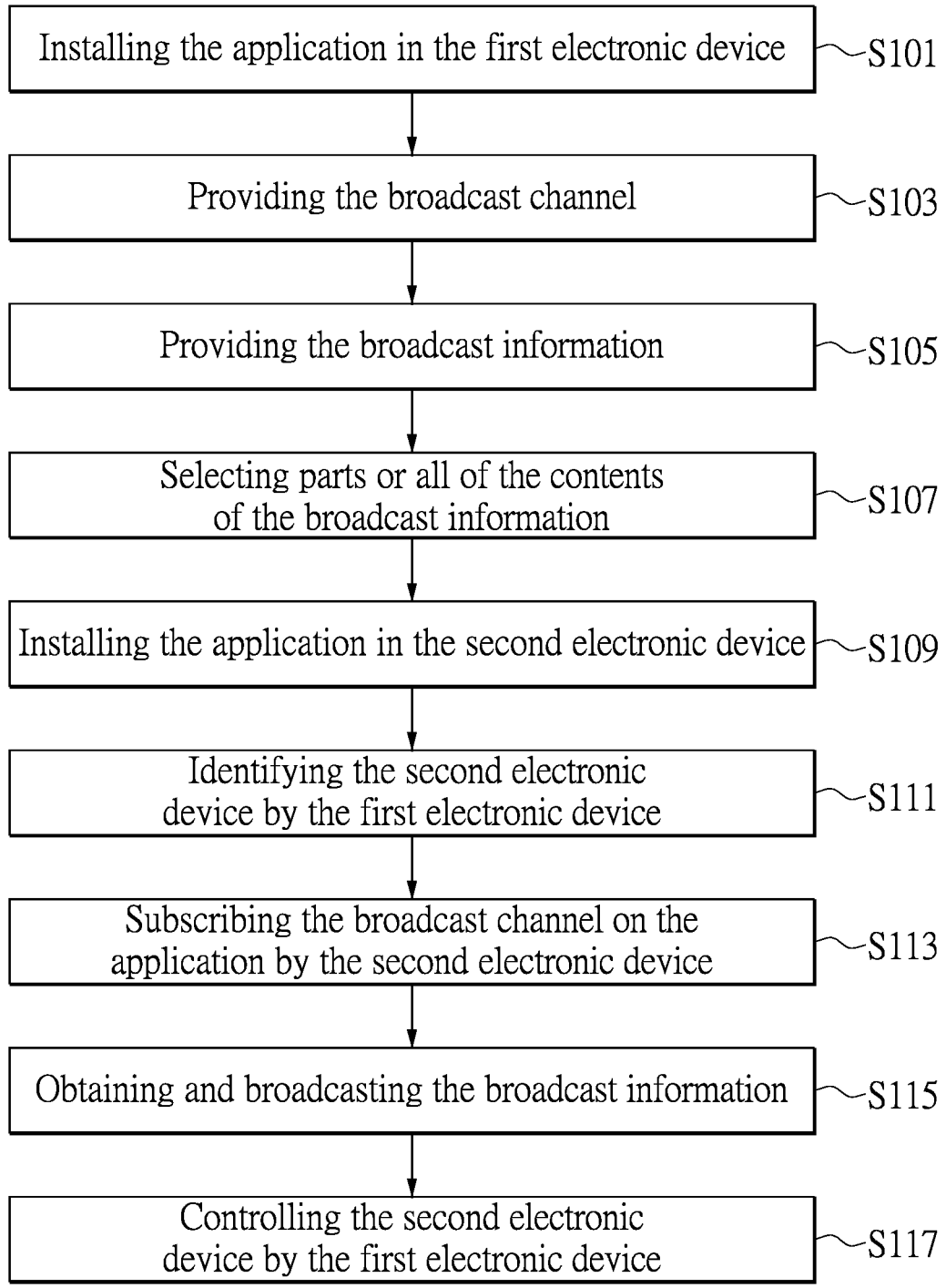
FIG. 10 is a flowchart diagram of a scenario oriented information broadcasting method based on the Internet of Things according to the embodiment of the present disclosure.

Reference is made to FIG. 10, which is a flowchart diagram of a scenario oriented information broadcasting method based on the Internet of Things according to the embodiment of the present disclosure. As shown in FIG. 10, the scenario oriented information broadcasting method of the embodiment includes the following steps S101 to S117. It should be understood that, an order of the steps S101 to S117 may be adjusted according to actual requirements and contents of the steps S101 to S117 may be adjusted according to the above descriptions.

In step S101, the application is installed into the first electronic device.

In step S103, the first electronic device provides the first broadcast channels on the application and provides the first broadcast information in each of the first broadcast channels via the Internet of Things.

In step S105, all or parts of the contents of the first broadcast information are selected (by using the first selection tool) by the first electronic device.

In step S107, the application is installed into the second electronic device.

In step S109, the user is logged into the application on the second electronic device.

In step S111, the first electronic device identifies the identification information that is inputted by the user that intends to be logged into the application on the second electronic device.

In step S113, after the second electronic device is successfully identified, the second electronic device subscribes the first broadcast channel on the application.

In step S115, the second electronic device obtains and broadcasts all or parts of the contents of the first broadcast information that are provided by the first electronic device in the subscribed first broadcast channel.

In step S117, the first electronic device controls the second electronic device. For example, the first electronic device may control the second electronic device to manage screen information displayed on the screen of the second electronic device.

In practice, the scenario oriented information broadcasting method may further include the following steps that may be performed by the scenario oriented information broadcasting system as shown in FIGS. 1 to 3 and FIGS. 4A and 4B, which are described in detail in the following. Remaining parts of the contents of the first broadcast information that are not selected by the first selection tool are replaced with a first blank region such that the first blank region but not the contents of the first broadcast information that are not selected is broadcasted to and displayed on the second electronic device. Answers are filled in the first blank region on the second electronic device to generate a first online answer sheet according to all or parts of the contents of the first broadcast information that are selected by the first selection tool and displayed on the second electronic device. The first electronic device compares contents of the first online answer sheet with all of the contents of the first broadcast information.

In practice, the scenario oriented information broadcasting method may further include the following step that may be performed by the scenario oriented information broadcasting system as shown in FIG. 5, which is described in detail in the following. When the second electronic devices subscribe one of the first broadcast channels and respectively request the first electronic device to broadcast different second issue information, the first electronic device determines an arrangement, a display style and an order of the second issue information of the second electronic devices displayed on the first electronic device based on authorities granted to the second electronic devices.

In practice, the scenario oriented information broadcasting method may further include the following step that may be performed by the scenario oriented information broadcasting system as shown in FIGS. 6A, 6B and 7, which is described in detail in the following. The second electronic device subscribes one of the first broadcast channels and requests the first electronic device to broadcast the second issue information when the third electronic device meets the second specified condition. For example, the second electronic device requests the first electronic device to broadcast the second issue information when the third electronic device passes the vicinity of the first electronic device.

In practice, the scenario oriented information broadcasting method may further include the following steps that may be performed by the scenario oriented information broadcasting system as shown in FIGS. 8 and 9, which are described in detail in the following. The second electronic device subscribes one of the first broadcast channels. The first electronic device sequentially broadcasts contents of the first broadcast information in the one of the first broadcast channels. The second electronic device requests the first electronic device to output a first reminder message for reminding the second electronic device when the first electronic device is ready to broadcast or is broadcasting the contents of the first broadcast information that is designated by the second electronic device.

In summary, a conventional information broadcasting system only allows the user to broadcast or issue all of the contents of information. However, the present disclosure provides the scenario oriented information broadcasting system, which allows the user to only select and broadcast or issue parts of the contents of information to facilitate interactions between users, for example, the teacher can provide opportunities for the students to practice by themselves, thereby improving learning of the students in the course.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A scenario oriented information broadcasting system based on an Internet of Things, comprising:
   a first electronic device configured to provide a plurality of first broadcast channels on an application and provide different first broadcast information respectively in the first broadcast channels via the Internet of Things, wherein a first selection tool is dragged to select a region in which all or parts of contents of the first broadcast information in one of the first broadcast channels are displayed on the first electronic device based on a teaching scenario; and a plurality of second electronic devices connected to the first electronic device, wherein an application is installed on each of the second electronic devices, each of the second electronic devices is identified by the first electronic device when a user intends to be logged into the application on each of the second electronic devices, and after each of the second electronic devices is successfully identified, each of the second electronic devices is permitted to subscribe each of the first broadcast channels on the application via the Internet of Things, and then obtains and broadcasts all or parts of the contents of the first broadcast information that are selected on the first electronic device;

wherein the first electronic device issues a first subscription instruction to each of the second electronic devices to subscribe each of the second electronic devices, and then receives a first learning command issued by each of the second electronic devices;

wherein remaining parts of the contents of the first broadcast information that are not selected are replaced with a first blank region such that the first blank region but not the contents of the first broadcast information that are not selected is broadcasted to and displayed on each of the second electronic devices, answers are filled in the first blank region on each of the second electronic devices to generate a first online answer sheet according to the contents of the first broadcast information that are selected by the first selection tool and displayed on each of the second electronic devices, and the first electronic device compares contents of the first online answer sheet with the contents of the first broadcast information in the one of the first broadcast channels.

2. The scenario oriented information broadcasting system based on the Internet of Things according to claim 1, wherein each of the second electronic devices provides a plurality of second broadcast channels on the application and provides different second broadcast information respectively in the second broadcast channels via the Internet of Things, and a second selection tool is dragged to select a region in which all or parts of contents of the second broadcast information in one of the second broadcast channels are displayed on the second electronic device based on the teaching scenario;

wherein each of the second electronic devices issues a second subscription instruction to the first electronic device to subscribe the first electronic device, and then receives a second learning command issued by the first electronic device.

3. The scenario oriented information broadcasting system based on the Internet of Things according to claim 2, wherein remaining parts of the contents of the second broadcast information that are not selected are replaced with a second blank region such that the second blank region but not the contents of the second broadcast information that are not selected is broadcasted to and displayed on the first electronic device, answers are filled in the second blank region on the first electronic device to generate a second online answer sheet according to the contents of the second broadcast information that are selected and displayed on the first electronic device, and the second electronic device compares contents of the second online answer sheet with the contents of the second broadcast information in the one of the second broadcast channels.

4. The scenario oriented information broadcasting system based on the Internet of Things according to claim 2, wherein, when the first electronic device subscribes one of the second broadcast channels and requests each of the second electronic devices to broadcast first issue information, each of the second electronic devices determines an arrangement, a display style and an order of contents of the first issue information displayed on each of the second electronic devices based on an authority granted to the first electronic device.

5. The scenario oriented information broadcasting system based on the Internet of Things according to claim 2, wherein the first electronic device subscribes one of the second broadcast channels, and the first electronic device requests the first electronic device, one of the second electronic devices or a third electronic device to broadcast first issue information when the third electronic device meets a first specified condition.

6. The scenario oriented information broadcasting system based on the Internet of Things according to claim 5, wherein when the second electronic devices subscribe one of the first broadcast channels and respectively request the first electronic device to broadcast different second issue information, the first electronic device determines an arrangement, a display style and an order of the second issue information of the second electronic devices displayed on the first electronic device based on authorities granted to the second electronic devices.

7. The scenario oriented information broadcasting system based on the Internet of Things according to claim 5, wherein each of the second electronic devices subscribes one of the first broadcast channels, and each of the second electronic devices requests the first electronic device, one of the second electronic devices or the third electronic device to broadcast second issue information when the third electronic device meets a second specified condition.

8. The scenario oriented information broadcasting system based on the Internet of Things according to claim 1, wherein each of the second electronic devices subscribes one of the first broadcast channels, the first electronic device sequentially broadcasts contents of the first broadcast information in the one of the first broadcast channels, and each of the second electronic devices requests the first electronic device to output a first reminder message to the second electronic device, to remind a user of the second electronic device that the first electronic device is ready to broadcast or is broadcasting one of the contents of the first broadcast information that is designated by each of the second electronic devices.

9. The scenario oriented information broadcasting system based on the Internet of Things according to claim 8, wherein the first electronic device subscribes a second broadcast channel provided by each of the second electronic devices, each of the second electronic devices sequentially broadcasts contents of second broadcast information in the second broadcast channel, and the first electronic device requests each of the second electronic devices to output a second reminder message to the first electronic device, to remind the user of the first electronic device that the second electronic device is ready to broadcast or is broadcasting one of the contents of the second broadcast information that is designated by the first electronic device.

\* \* \* \* \*